US006779198B1

(12) United States Patent
Morinaga et al.

(10) Patent No.: US 6,779,198 B1
(45) Date of Patent: Aug. 17, 2004

(54) DATA PROCESSING APPARATUS, DATA PROCESSING METHOD, AND RECORDING MEDIUM

(75) Inventors: Takeo Morinaga, Kanagawa (JP); Iwao Yamamoto, Tokyo (JP); Hajime Inoue, Chiba (JP); Noriyuki Yamamoto, Tokyo (JP); Koichi Oyama, Tokyo (JP); Masashi Nakamura, Chiba (JP); Hisayoshi Moriwaki, Tokyo (JP)

(73) Assignee: Sony Corporation (JP)

( * ) Notice: Subject to any disclaimer, the term of this patent is extended or adjusted under 35 U.S.C. 154(b) by 737 days.

(21) Appl. No.: 09/677,567

(22) Filed: Oct. 2, 2000

(30) Foreign Application Priority Data

Oct. 5, 1999 (JP) .......................................... P11-283929

(51) Int. Cl.[7] .......................... H04N 7/173; H04N 7/16
(52) U.S. Cl. ........................ 725/134; 370/537; 386/98; 348/423.1
(58) Field of Search ................................. 370/351, 389, 370/394, 395.1, 398, 395.2, 395.61–395.64, 395.7–395.72, 412, 413, 464, 465, 509–512, 537; 386/68, 98, 95; 348/423.1; 725/134, 142, 133, 141, 153

(56) References Cited

U.S. PATENT DOCUMENTS 4,918,687 A * 4/1990 Bustini et al. ............... 370/389

| | | | |
|---|---|---|---|
| 5,544,176 A | * 8/1996 | Fujii et al. | 348/423.1 |
| 5,619,337 A | 4/1997 | Naimpally | 386/83 |
| 5,914,941 A | * 6/1999 | Janky | 370/313 |
| 6,035,304 A | * 3/2000 | Machida et al. | 725/134 |
| 6,363,149 B1 | * 3/2002 | Candelore | 705/51 |
| 6,493,362 B1 | * 12/2002 | Inazumi | 370/537 |
| 6,584,227 B2 | * 6/2003 | Nakaya | 382/236 |
| 6,704,493 B1 | * 3/2004 | Matthews et al. | 386/98 |

FOREIGN PATENT DOCUMENTS

| EP | 0 740 478 A | 10/1996 |
|---|---|---|
| EP | 0 749 244 A | 12/1996 |

* cited by examiner

Primary Examiner—Hassan Kizou
Assistant Examiner—David Odland
(74) Attorney, Agent, or Firm—Lerner, David, Littenberg, Krumholz & Mentlik, LLP

(57) ABSTRACT

A transport stream is received and recorded, and the recorded transport stream is reproduced normally. A cycle timer generates a time stamp based on a clock generated by means of a clock generation circuit that is independent of the system clock generated by means of a built-in PLL of an AV decoder, a receiver adds the time stamp to a TS packet, and the TS packet is recorded in a hard disk. On the other hand, a transmitter supplies the TS packet read out from the hard disk to the AV decoder by way of a switch, MVLink-IC, DEMUX, and FIFO memory at the timing so that the time interval between adjacent TS packets is coincident with that of the time when it was received based on the time stamp added to the TS packet.

26 Claims, 11 Drawing Sheets

| PACKET TYPE | SWITCH 62 | SWITCH 63 |
|---|---|---|
| DISCARDING PACKET | OFF | OFF |
| RECORDING PACKET | ON | OFF |
| RECORDING/CONTROLLING PACKET | ON | ON |
| CONTROLLING PACKET | OFF | ON |

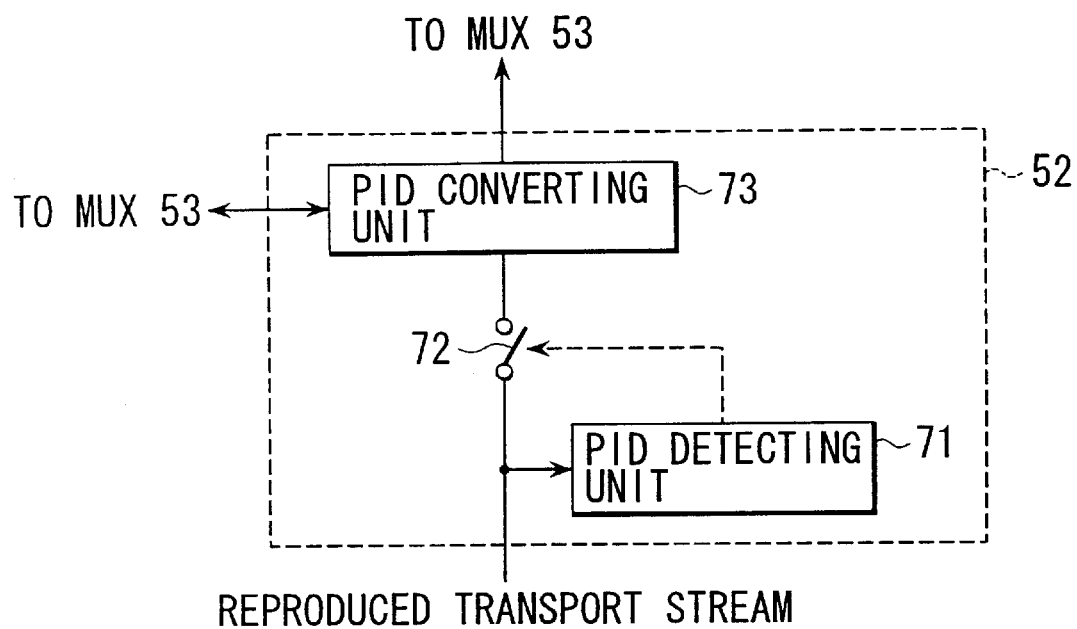

FIG. 9A RECEIVED TRANSPORT STREAM
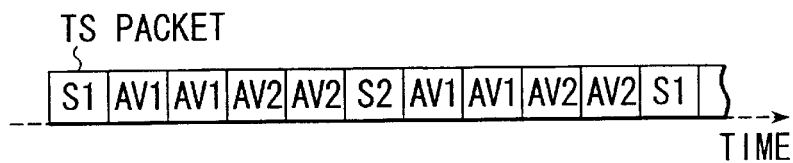
FIG. 9B TS PACKET TO BE RECORDED
FIG. 9C DISCARDING PACKET
FIG. 9D RECORDING PACKET
FIG. 9E RECORDING/CONTROLLING PACKET
FIG. 9F CONTROLLING PACKET
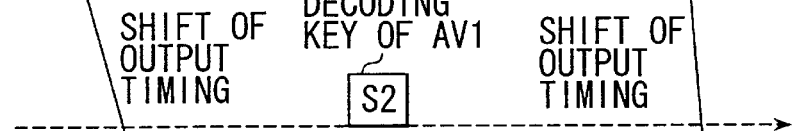
FIG. 9G REPRODUCED TRANSPORT STREAM
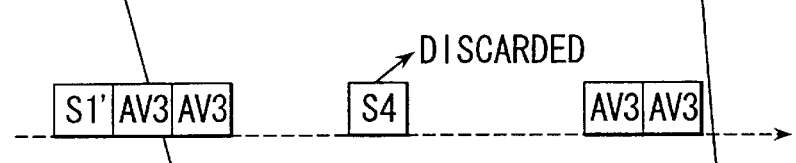
FIG. 9H TS PACKET SUPPLIED FROM OUTPUT PID PARSER TO MUX
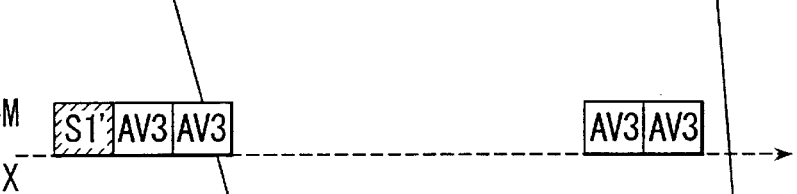
FIG. 9I TS PACKET SUPPLIED FROM MUX (OUTPUT TRANSPORT STREAM)
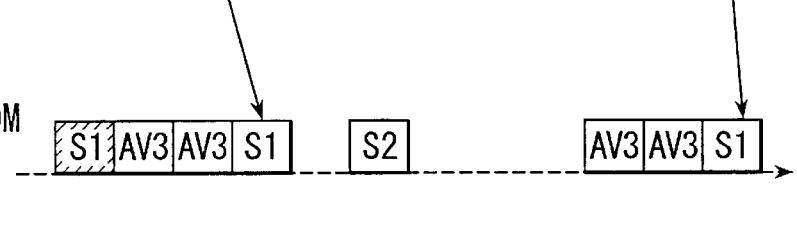

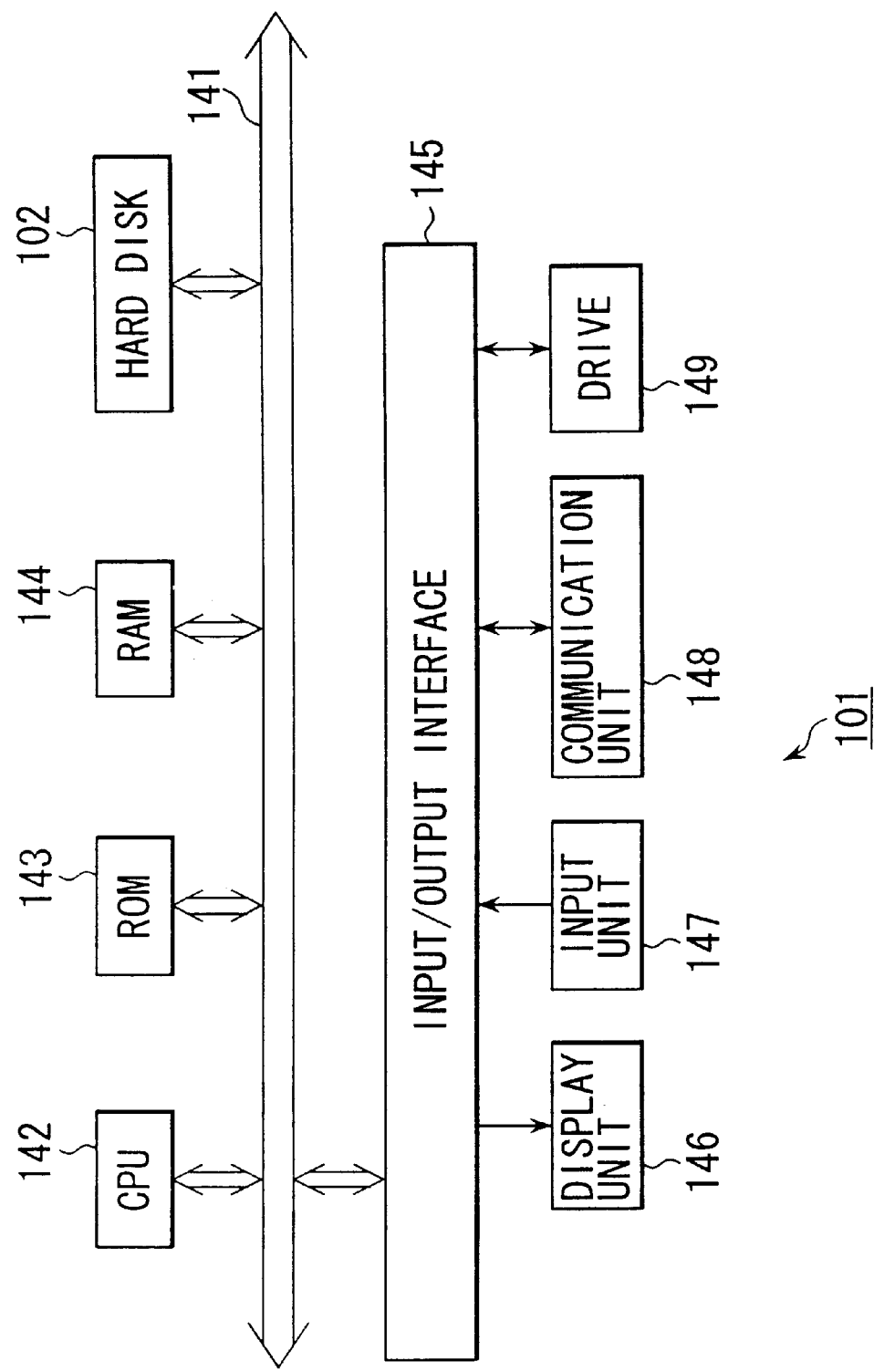

DATA PROCESSING APPARATUS, DATA PROCESSING METHOD, AND RECORDING MEDIUM

BACKGROUND OF THE INVENTION

1. Field of the Invention

This invention relates to a data processing apparatus and a data processing method, and more particularly relates to a data processing apparatus, a data processing method, and a recording medium that are capable of receiving and recording the transport stream, for example, broadcasted as a digital satellite broadcast program and reproducing the recorded transport steam normally.

2. Description of Related Art

Recently, the digital satellite broadcast according to the transport stream has been started practically, and various digital satellite broadcast receiving apparatus have been commercialized. In such digital satellite broadcast receiving apparatus, a packet that constitutes the received transport stream is stored in an FIFO (First In First Out) memory temporarily, and then supplied to AV (Audio Visual) decoder successively. In the AV decoder, the data loaded on the packet is MPEG (Moving Picture Experts Group)2-decoded, and as the result a picture and sound are generated.

Herein, the AV decoder is provided with, for example, a built-in PLL (Phase Lock Loop), the PLL generates the system clock from 27 MHz clock to thereby decode the packet.

In detail, some packets that constitute the transport packet include PCR (Program Clock Reference) for calibrating the system clock, PTS (Presentation Time Stamp) for representing the display time, and DTS (Decoding Time Stamp) for representing the decoding time. The built-in PLL of the AV decoder calibrates 27 MHz clock according to PCR, and generates the system clock. The AV decoder performs the processing so that the packet is decoded and the picture and sound obtained from the decoding are generated when the system clock is coincident with the time of DTS and PTS respectively.

However, the digital satellite broadcast receiving apparatus having a built-in device such as hard disk or the like for recording a digital satellite broadcast program has not been commercialized yet. In the case such digital satellite broadcast receiving apparatus is realized, it is impossible to calibrate 27 MHz clock by use of PCR included in the transport stream read out from the hard disk because the time interval between adjacent packets that constitute the transport stream broadcasted as a digital satellite broadcast program is not coincident generally with the time interval between adjacent packets generated when the transport stream that has been recorded in the hard disk is read out from the hard disk. As the result, it is required for the PLL of the AV decoder to generate the clock obtained by so-called oscillation by free running (referred to as free-run clock hereinafter).

In this case, because the AV decoder performs processing synchronously with the free-run clock, the free-run clock should be adjusted so as to be coincident with the frequency of the system clock obtained by use of PCR included in the transmitted transport stream in order to perform normal decoding in the AV decoder. Furthermore, it is required to control the reading of the packet recorded in the hard disk based on the accumulation quantity of the packet in the FIFO memory so that the FIFO memory located on the front end of the AV decoder will not overflow or underflow.

However, in the case that the frequency of the free-run clock cannot be adjusted within the guaranteed range in relation to, for example, the allowable deviation of picture color frequency, it is expected that the normal color is not displayed. Furthermore, in the case that the free-run clock cannot be adjusted so as to be coincident with the frequency of the system clock obtained by use of PCR included in the transmitted transport stream, for example, it is expected that the sound is not generated.

Furthermore, some IC (Integrated Circuit) having the AV decoder for performing decoding of the transport stream could not control the frequency of the free-run clock.

Furthermore, in the case that reading out of the packet recorded in the hard disk is controlled based on the accumulation quantity of the packet in the FIFO memory located on the front end of the AV decoder, a built-in CPU of the digital satellite broadcast receiving apparatus controls the reading. However, if the processing capacity of the CPU is low, it is difficult for the CPU to control the reading out of the packet from the hard disk.

SUMMARY OF THE INVENTION

The present invention has been accomplished in view of such problem, and the present invention provides an apparatus and a method that are capable of, for example, receiving and recording the transport stream, and reproducing the recorded transport stream normally.

A data processing apparatus is characterized by comprising a clock generation means for generating an independent clock that is independent of the system clock, a time stamp generation means for generating a time stamp based on the independent clock, an adding means for adding the time stamp to the packet that constitutes the received stream, a first output means for supplying a packet to which the time stamp is added to a recording apparatus, and a second output means for supplying the packet reproduced from the recording apparatus based on the time stamp added to the packet.

The data processing apparatus further comprises a recording apparatus.

The stream may be a transport stream.

The second output means may supply the packet reproduced from the recording apparatus to the processing apparatus or supply to the processing apparatus under the control performed by means of the processing apparatus.

A data processing method is characterized by comprising a clock generation step of generating the independent clock that is independent of the system clock, a time stamp generation step of generating a time stamp based on the independent clock, an adding step of adding the time stamp to the packet that constitutes the received stream, a first output step of supplying a packet to which the time stamp is added to a recording apparatus, and a second output step of supplying the packet reproduced from the recording apparatus based on the time stamp added to the packet.

A recording medium is characterized by having a program including a clock generation step of generating the independent clock that is independent of the system clock, a time stamp generation step of generating a time stamp based on the independent clock, an adding step of adding the time stamp to the packet that constitutes the received stream, a first output step of supplying a packet to which the time stamp is added to a recording apparatus, and a second output step of supplying the packet reproduced from the recording apparatus to a processing apparatus for processing the packet based on the time stamp added to the packet.

In the data processing apparatus, data processing method, and recording medium of the present invention, an independent clock that is independent of the system clock is generated and a time stamp is generated based on the independent clock. The time stamp is added to a packet that constitutes a received stream, and the packet having the added time stamp is supplied to a recording apparatus. On the other hand, a packet reproduced from the recording apparatus is supplied to the processing apparatus for processing a packet based on the time stamp added to the packet.

Therefore, the processing apparatus can process the packet reproduced from the recording apparatus in the same manner as used to process the packet that constitutes the received stream.

BRIEF DESCRIPTION OF THE DRAWINGS

FIG. 8A and FIG. 8B are diagrams for describing the detail of an output PID parser 52 shown in FIG. 6.

FIG. 9A to FIG. 9I are time charts for describing the processing performed when the transport stream is recorded and reproduced simultaneously in the digital satellite broadcast receiving apparatus shown in FIG. 5.

FIG. 11 is a block diagram for illustrating an exemplary structure of a computer 101 shown in FIG. 10A and FIG. 10C.

DETAILED DESCRIPTION OF THE PREFERRED EMBODIMENTS

Figure 1:
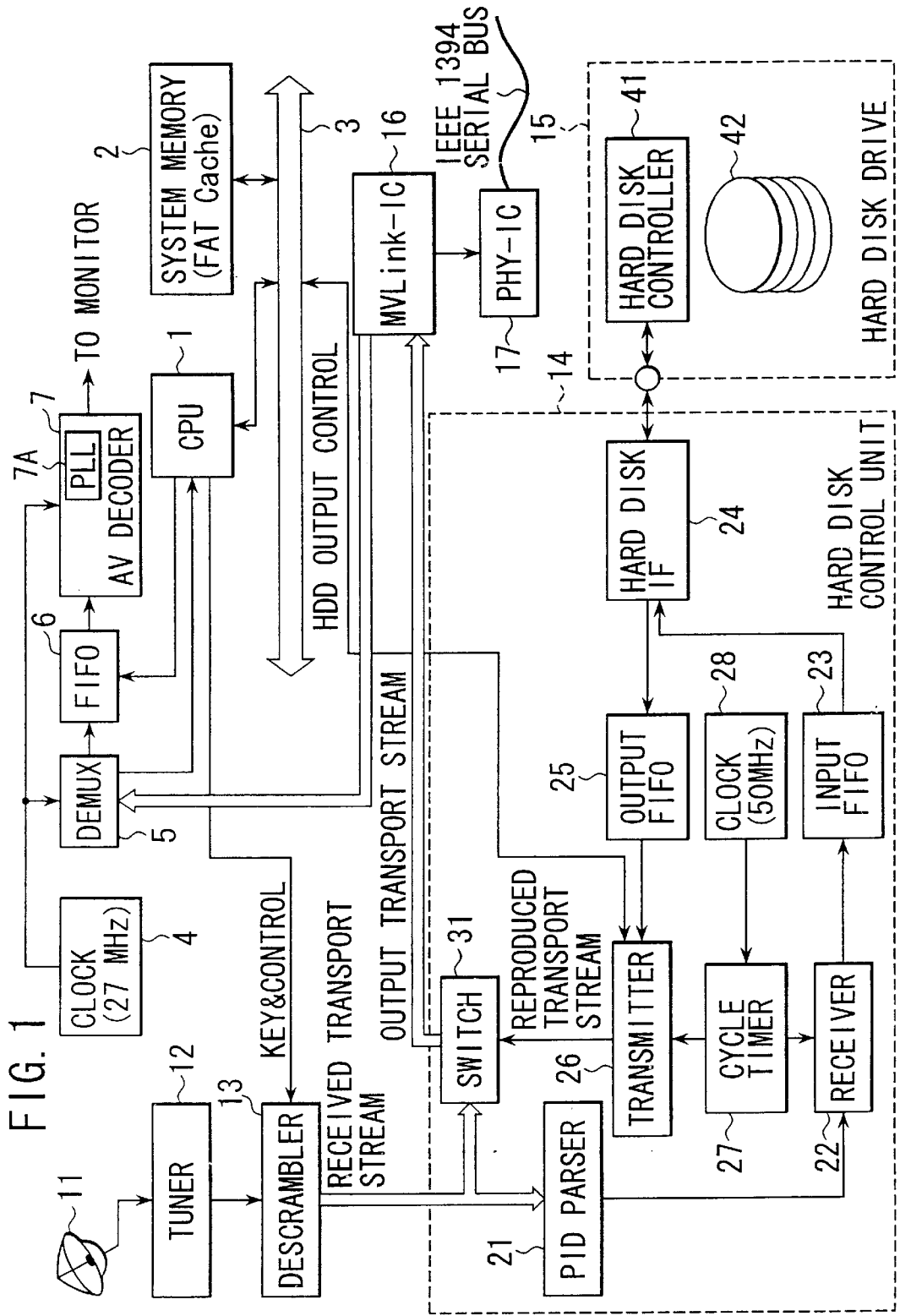
FIG. 1 is a block diagram for illustrating an exemplary structure of a digital satellite broadcast receiving apparatus having a built-in hard disk drive 15.

FIG. 1 shows an exemplary structure of an embodiment of a digital satellite broadcast receiving apparatus to which the present invention is applied.

The digital satellite broadcast receiving apparatus receives a transport stream as the digital satellite broadcast program from a broadcasting station not shown in the drawing and displays the image and sound as the transport stream thereof, and furthermore reproduces the recorded transport stream that has been recorded.

In detail, An antenna 11 receives the digital satellite broadcast wave, and the received signal is supplied to a tuner 12. The tuner 12 decodes the signal received from the antenna 11 to obtain the transport stream, and supplies it to a descrambler 13. The descrambler 13 descrambles the scrambled transport stream supplied from the tuner 12 by use of a decoding key supplied from a CPU 1 under the control by means of the CPU 1, and supplies it to a hardkdisk control unit 14.

The transport stream supplied from the descrambler 13 (referred to as received transport stream hereinafter properly) is supplied to a PID (Packet Identification) parser 21 and a switch 31. In addition to the received transport stream, the transport stream that is supplied from the transmitter 26 and reproduced by means of the hard disk drive 15 is supplied to the switch 31.

When the received transport stream is to be reproduced, the switch 31 selects the received transport stream from among two transports supplied thereto (the received transport stream and the transport stream supplied from the transmitter 26), and supplies it to an MVLink-IC (MVLink-IC (MPEG (Moving Picture Experts Group) Link Integrated circuit) 16.

The MVLink-IC 16 subjects the output transport stream to the link layer processing in the layer structure of IEEE (Institute of Electrical and Electronics Engineers) 1394 serial bus, and supplies it to a PHY-IC 17. Otherwise, the MVLink-IC 16 supplies the output transport stream to a DEMUX (demultiplexer) 5.

Herein, the PHY-IC 17 performs the link layer processing in the layer structure of the IEEE 1394 serial bus, and when the PHY-IC 17 receives the output transport stream from the MVLink-IC 16, the PHY-IC 17 isochronously transfers the output transport stream to an IEEE 1394 apparatus not shown in the drawing by way of the IEEE 1394 serial bus.

The DEMUX 5 having a microcomputer and memory or the like that are not shown in the drawing separates the TS packet on which the section data (the control data used for controlling the decoding key for descrambling the scrambled PAT (Program Association Table), PMT (Program Map Table), and transport stream and others) are loaded from the transport packet that constitutes the output transport stream (referred to as TS packet hereinafter properly) supplied from the MVLink-IC 16, and furthermore analyzes the content thereof, and supplies the necessary control data to the CPU 1.

As described herein above, the CPU 1 supplies the decoding key out of the section key supplied from the DEMUX 5 to the descrambler 13, and controls the descrambler 13 based on other section data supplied from the DEMUX 5.

The DEMUX 5 operates synchronously with the 27 MHz clock generated from the clock generation circuit 4, and not only separates the TS packet on which the control data is loaded from the output transport stream but also separates the packet on which the video data and the audio data (referred to as AV data including both data hereinafter properly) of the program selected by operating the remote commander or the like without intention of a user are loaded, and supplies it to an FIFO memory 6.

The FIFO memory 6 temporarily stores the TS packet supplied from the DEMUX 5 under the control of the CPU 1, and supplies the stored TS packet to the AV decoder 7.

The AV decoder 7 operates synchronously with the 27 MHz clock supplied from the clock generation circuit 4, MPEG2-decodes the TS packet supplied from the FIFO memory 6, and supplies the AV data obtained as the result to a monitor not shown in the drawing. Thereby, the monitor generates (display) a picture and sound as the digital satellite broadcast program.

The AV decoder 7 has a built-in PLL 7A, and the PLL 7A calibrates the clock supplied from the clock generation circuit 4 according to the PCR included in the transport stream of the TS packet supplied to the AV decoder 7 to thereby generate the system clock. The AV decoder 7 performs processing so that the packet is decoded and the picture and sound obtained by decoding are generated when the system clock is coincident with the DTS and PTS included in the transport stream supplied to the AV decoder 7.

Thereby, overflow and underflow of the FIFO memory 6 is prevented, and the picture and sound are generated normally.

On the other hand, in the case that the received transport stream is to be recorded, the switch 31 also selects the received transport stream from among two input transport streams (the received transport stream and the transport stream supplied from the transmitter 26), and supplies it to the DEMUX 5 by way of the MVLink-IC 16 as the output transport stream.

As described hereinabove, the DEMUX 5 separates the TS packet on which the control data is loaded from the output transport stream, then separates the necessary data loaded on the TS, and supplies it to the CPU 1. The CPU 1 controls the descrambler 13 based on the control data. Thereby, the descrambler 13 descrambles the transport stream containing the TS packet that is to be recorded.

The received transport stream is also supplied to the PID parser 21 as described hereinabove, and the PID parser 21 supplies only the TS packet of the program that is to be recorded to a receiver 22 with reference to the PID of the TS packet that constitutes the received transport stream supplied thereto (residual TS packet is discarded). The receiver 22 adds the time stamp generated by means of the cycle timer 27 to the TS packet supplied from the PID parser 21, and supplies it to an input FIFO (First In First Out) memory 23.

Figure 2:
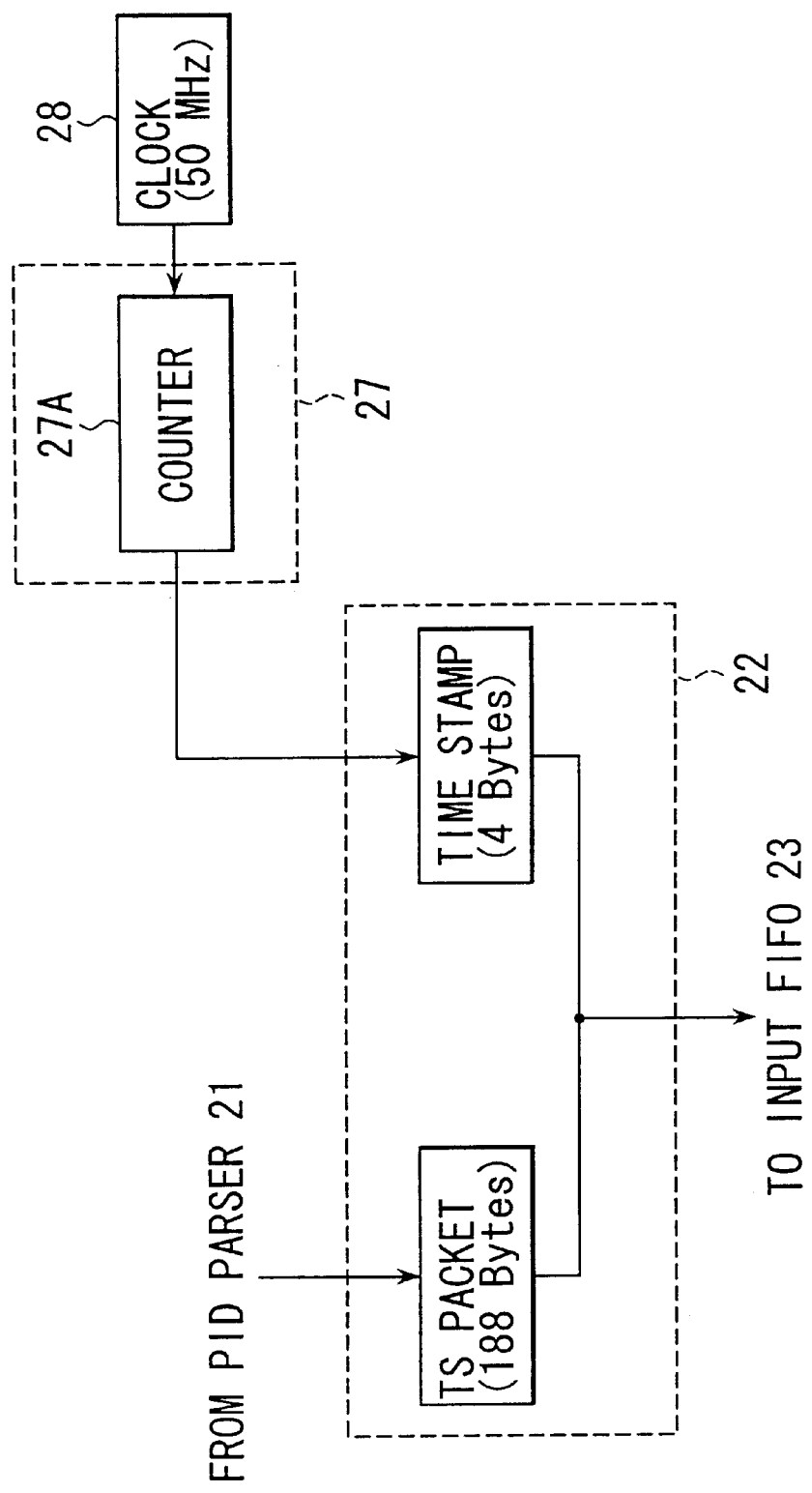
FIG. 2 is a diagram for illustrating the processing of a receiver 22 and cycle timer 27.

In detail, as shown in FIG. 2, the cycle timer 27 has a built-in counter 27A that counts, for example, 50 MHz clock generated from the clock generation circuit 28 for generating a clock independent of the system clock generated from the built-in PLL 7A of the AV decoder 7 for MPEG-decoding the TS packet. The counter 27A counts the clock generated from the clock generation circuit 28, and supplies the count value of, for example, 4 byte count value to the receiver 22 as a time stamp. The receiver 22 adds the 4 byte time stamp supplied from the cycle timer 27 to the TS packet supplied from the PID parser 21, and supplies it to the input FIFO memory 23.

The TS packet that constitutes the transport stream has generally 188 bytes, and the TS packet to which 4 byte time stamp has been added and sent out from the receiver 22 has 192 (=188+4) bytes.

The description returns to FIG. 1. The input FIFO memory 23 successively stores the TS packet to which the time stamp has been added supplied from the receiver 22, and supplies the stored TS packets to the hard disk IF (Interface) 24 in the order of storing.

Upon receiving the TS packet from input FIFO 23, the hard disk IF 24 supplies the TS packet to the hard disk drive 15.

In the hard disk drive 15, the TS packet supplied from the hard disk IF 24 is received by means of a hard disk controller 41 and recorded in a hard disk 42.

Next, in the case that the TS packet recorded in the hard disk 42 as described hereinabove is to be reproduced, the hard disk controller 41 reads out the transport stream that is served as the sequence of the TS packet (herein, the TS packet to which 4 byte time stamp has been added) recorded in the hard disk 42 (referred to as reproduced transport stream hereinafter properly) and supplies it to the hard disk control unit 14.

In the hard disk control unit 14, the hard disk IF 24 receives the reproduced transport stream and supplies it to the output FIFO memory 25. The output FIFO memory 25 stores the TS packet that constitutes the reproduced transport stream supplied from the hard disk IF 24 successively, and sends out the stored TS packets in the order of FIFO-fashion to the transmitter 26.

The time stamp generated from the cycle timer 27 is supplied to the transmitter 26 as shown in FIG. 26, the transmitter 26 compares the time stamp that is added to the TS packet supplied from the output FIFO memory 25 with the time stamp supplied from the cycle time 27 basically, and sends out, for example, the TS packet supplied from the output FIFO memory 25 to the switch 31 at the time when these two time stamps are coincident each other. In detail, because the transport stream that is the sequence of the TS packet generated from the PID parser 21 is recorded in the hard disk drive 15 after it is temporarily stored in the input FIFO memory 23, at that time the time interval between adjacent TS packets that constitute the transport stream is changed, and that time interval is different from the time interval of the time when the transport stream was received.

Then, the transmitter 26 refers the time stamp added to the TS packet in the receiver 22, compares this time stamp with the time stamp generated from the cycle timer 27, and supplies the TS packet to the switch 31 when both time stamps are coincident each other. Thereby, the TS packet read out from the hard disk drive 15 is supplied to the switch 31 at the timing so that the time interval between adjacent TS packets is the same as that of the time when it is received.

The coincidence of the time stamp in this context includes not only the coincidence between the time stamp itself added to the TS packet read out from the hard disk drive 15 with the time stamp itself generated from the cycle timer 27, but also the coincidence between the time stamp added to the TS packet, that is the time stamp added to the head TS packet of the transport stream read out from the hard disk drive 15, under the assumption that the time stamp generated from the cycle timer 27 is initialized with the time stamp generated from the cycle timer 27.

Furthermore, the transmitter 26 deletes the time stamp added to the TS packet when the TS packet generated from the output FIFO memory 25 is supplied to the switch 31.

When the TS packet recorded in the hard disk 42 is reproduced, the switch 31 selects the reproduction transport stream generated from the transmitter 26, and supplies it to the MVLink IC 16 as the output transport stream. Subsequently, the reproduction transport stream served as the output transport stream is transferred isochronously on the IEEE 1394 serial bus by way of the PHY-IC 17 in the same manner as used in the processing of the reception transport stream, or supplied to a monitor by way of the DEMUX 5, FIFO memory 6, and AV decoder 7.

As described hereinabove, the time stamp is generated based on the clock generated from the clock generation circuit 28 independent of the clock generated from the clock generation circuit 4, the time stamp is added to the TS packet, and the added TS packet is recorded in the hard disk drive 15. The TS packet read out from the hard disk drive 15 is supplied to the switch 31 based on the time stamp added to it at the timing so that the time interval between adjacent TS packets is the same as that of the time when it was received. As the result, the TS packet read out from the hard disk drive 15 is supplied to the AV decoder 7 at the same timing (time interval) so that when the TS packet that constitute the received transport stream is supplied.

Therefore, the AV decoder 7 performs the processing in the same manner as used for decoding the TS packet that constitutes the received transport stream to thereby decode the TS packet read out from the hard disk drive 15. In detail, the AV decoder 7 calibrates the system clock generated from the built-in PLL 7A by use of the PCR included in the transport stream as the sequence of the TS packet read out from the hard disk diver 15, and furthermore performs the decoding of the TS packet and generation of the picture and sound obtained by decoding when the system clock is coincident with the DTS and PTS included in the transport stream to thereby prevent the overflow and underflow of the FIFO memory 6 and reproduce the picture and sound from the TS packet recorded in the hard disk drive 15 normally.

The CPU 1 is connected to the bus 3, reads out and executes a program stored in the system memory 2 connected to the same bus 3 to thereby perform various processing such as control of the descrambler 13 and other processing. The system memory 2 stores a program for activating the CPU 1 to perform various processing.

The transmitter 26 not only supplies the TS packet supplied from the output FIFO memory 25 based on the time stamp added to the TS packet as described hereinabove but also supplies the TS packet supplied from the output FIFO memory 25 to the switch 31 under the control performed by the CPU 1.

In other words, the CPU 1 supplies the control signal for controlling the output of the TS packet supplied from the hard disk drive 15 to the transmitter 26 by way of the bus 3. Thereby, the CPU 1 controls the transmitter 26 to supply the TS packet supplied from the output FIFO memory 25 to the switch 31 without regard for the time stamp added to the TS packet. In detail, The CPU 1 controls the transmitter 26 based on the accumulation quantity of the TS packet stored in the FIFO memory 6 so that the FIFO memory 6 will not overflow and underflow, and the transmitter 26 supplies the TS packet supplied from the output FIFO memory 25 to the switch 31 under the control performed by the CPU 1.

As described hereinabove, the CPU 1 controls the transmitter 26 to supply the TS packet to the switch 31 based on the accumulation quantity in the FIFO memory 6, and, for example, non-normal speed reproduction such as double speed reproduction is thereby performed.

Figure 3:
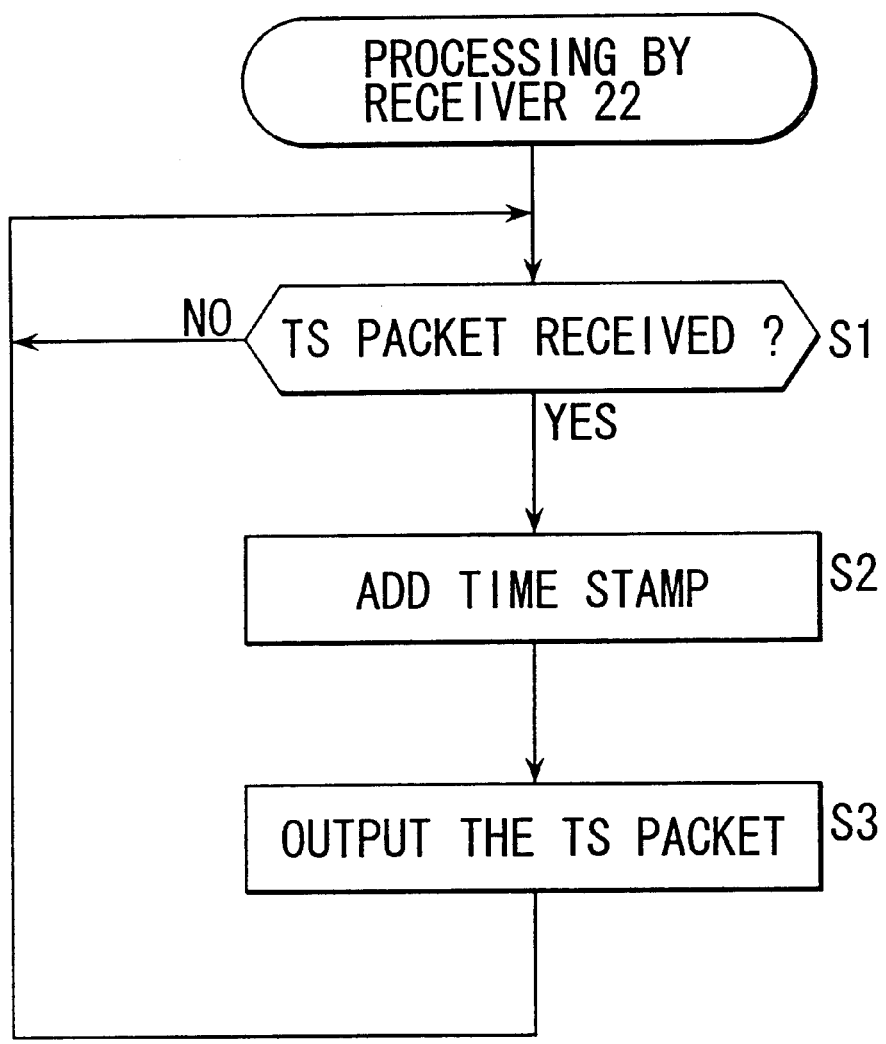
FIG. 3 is a flowchart for describing a routine of the receiver 22.

Next, the routine of the receiver 22 shown in FIG. 1 is described with reference to a flowchart shown in FIG. 3.

The receiver 22 determines whether the TS packet is received from the PID parser 21 or not at first in step S1, and if NO result is obtained, then the sequence returns to the step S1.

If Yes result is obtained in step S1, then the sequence proceeds to step S2, the receiver 22 adds the time stamp supplied from the cycle timer 27 to the received TS packet, and the sequence proceeds to step S3. The receiver 22 supplies the TS packet to which the time stamp has been added to the input FIFO 23, and the sequence returns to step S1. Subsequently, the same processing is repeated.

Figure 4:
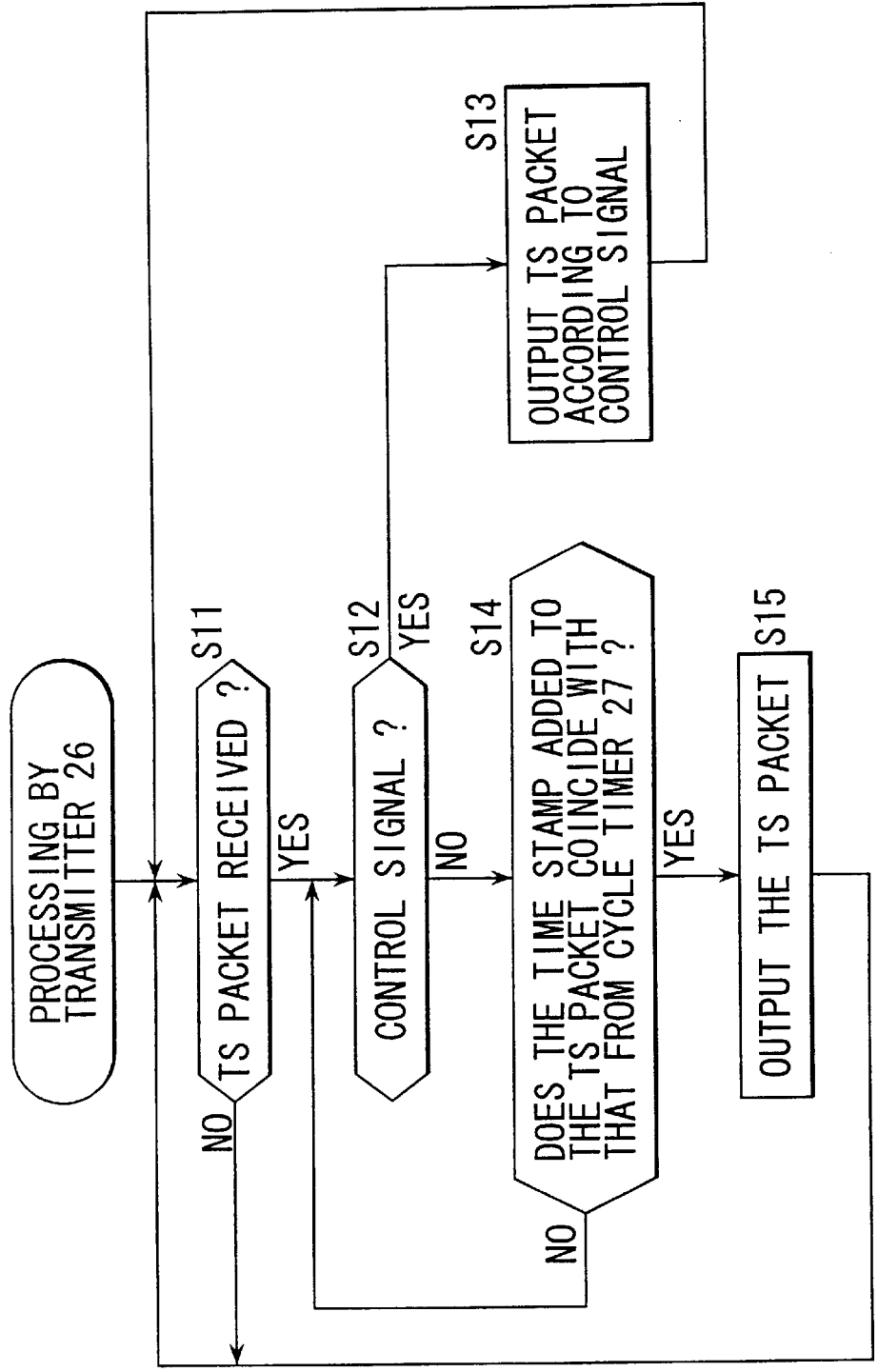
FIG. 4 is a flowchart for describing a routine of the transmitter 26.

Next, the routine of the transmitter 26 shown in FIG. 1 is described with reference to a flowchart shown in FIG. 4.

The transmitter 26 determines whether the TS packet is received from the output FIFO memory 25 or not in step S11 at first, and if NO result is obtained, the sequence returns to step S11.

On the other hand, if YES result is obtained in step S11, the sequence proceeds to step S12, and whether the control signal from the CPU 1 has been received or not is determined. If the control signal is determined to be received from the CPU 1 in step S12, then the sequence proceeds to step S13, the transmitter 26 supplies the received TS packet to the switch 31 according to the control signal supplied from the CPU 1, and the sequence returns to step S11.

On the other hand, if the control signal is determined to be not received from the CPU 1 in step S12, then the sequence proceeds to step S14, and whether the time stamp added to the TS packet supplied from the output FIFO 25 is coincident with the time stamp supplied from the cycle timer 27 or not is determined. If the time stamp added to the TS packet supplied from the output FIFO 25 is determined to be not coincident with the time stamp supplied from the cycle timer 27 in step S14, then the sequence returns to step S12.

Furthermore, if the time stamp added to the TS packet supplied from the output FIFO 25 is determined to be identical with the time stamp supplied from the cycle timer 27 in step S14, then sequence proceeds to step S15, and the transmitter 26 supplies the TS packet supplied from the output FIFO 25 to the switch 31. Then, the sequence returns to step S11, and the same processing is repeated thereafter.

The digital satellite broadcast receiving apparatus having the structure as described in FIG. 1 cannot function to perform simultaneous recording and reproducing unlike so-called delayed playback in which the received transport stream is recorded by means of the hard disk drive 15 while the recorded transport stream is being reproduced.

In other words, as described hereinabove, the switch 31 of the hard disk control unit 14 selects the received transport stream supplied from the descrambler 13 and sends it out as the output transport stream when the received transport stream is to be recorded, and on the other hand selects the reproduced transport stream supplied from the transmitter 26 and sends it out as the output transport stream when the transport stream stored in the hard disk drive 15 is to be reproduced.

Though it is required for switch 31 to select the reproduced transport stream supplied from the transmitter 26 consistently in order to reproduce the transport stream recorded in the hard disk drive 15, in this case the switch 31 cannot select the received transport stream supplied from the descrambler 13 as an output transport stream and cannot supply it to the DEMUX 5 by way of the MVLink-IC 16. As the result, the CPU 1 cannot obtain a decoding key used by means of the descrambler 13, and the descrambler 13 cannot descramble the transport stream.

Furthermore, in this case, because the control data loaded on the TS packet that constitutes the received transport stream is not supplied at all to the CPU 1, the CPU 1 cannot get the information or the like necessary for knowing the status of the digital satellite broadcast in real time, various problems likely occur.

Figure 5:
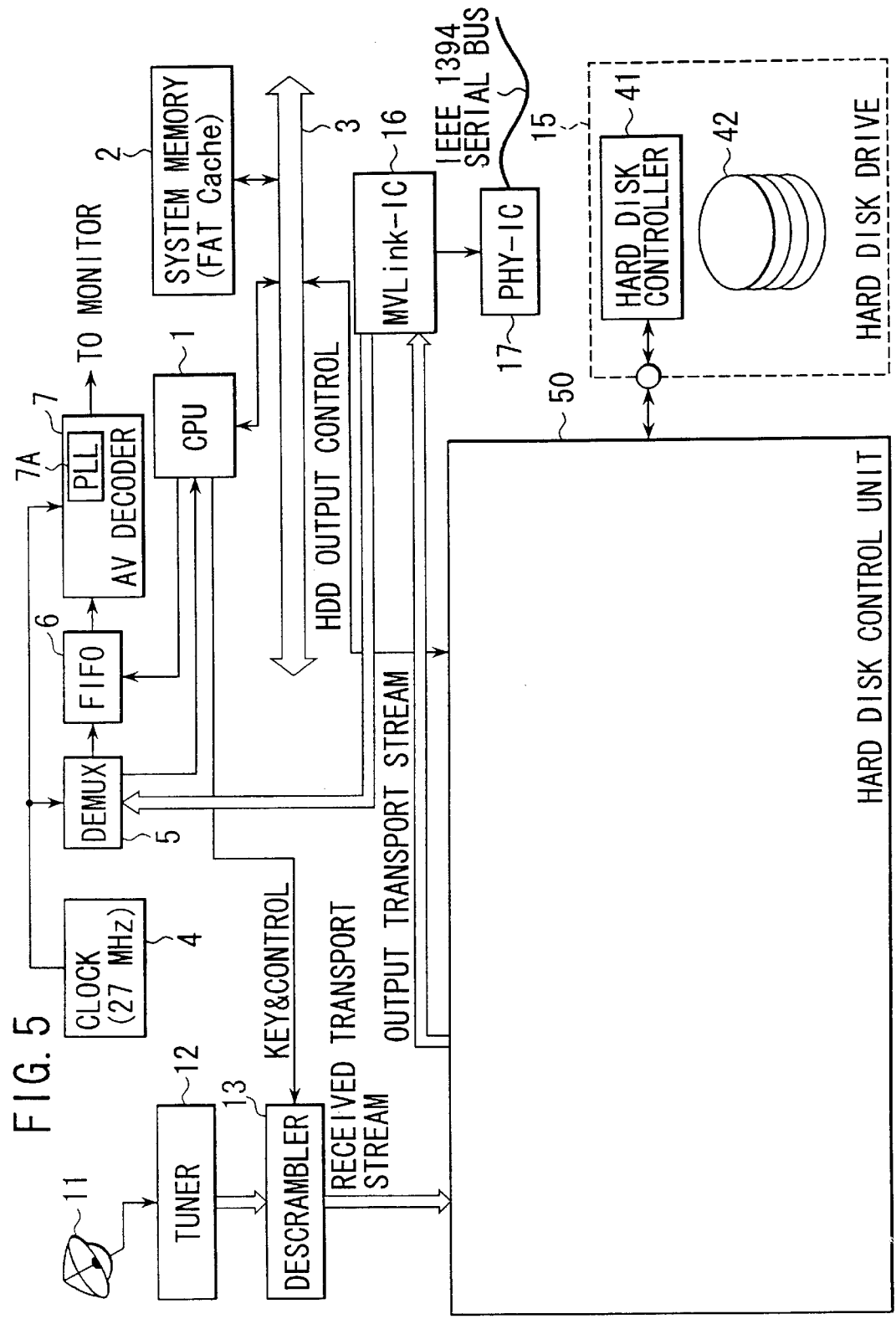
FIG. 5 is a block diagram for illustrating an exemplary structure of one embodiment of a digital satellite broadcast receiving apparatus to which the present invention is applied.

In view of the above problem, an exemplary structure of an embodiment of a digital satellite broadcast receiving apparatus to which the present invention is applied is shown in FIG. 5. In FIG. 5, the components corresponding to those shown in FIG. 1 are given the same characters, and the description is omitted hereinafter. In detail, the digital satellite broadcast receiving apparatus shown in FIG. 5 has the same structure as that of the digital satellite broadcast receiving apparatus shown in FIG. 1 excepting that a hard disk control unit 50 is provided instead of the hard disk control unit 14 shown in FIG. 1.

Figure 6:
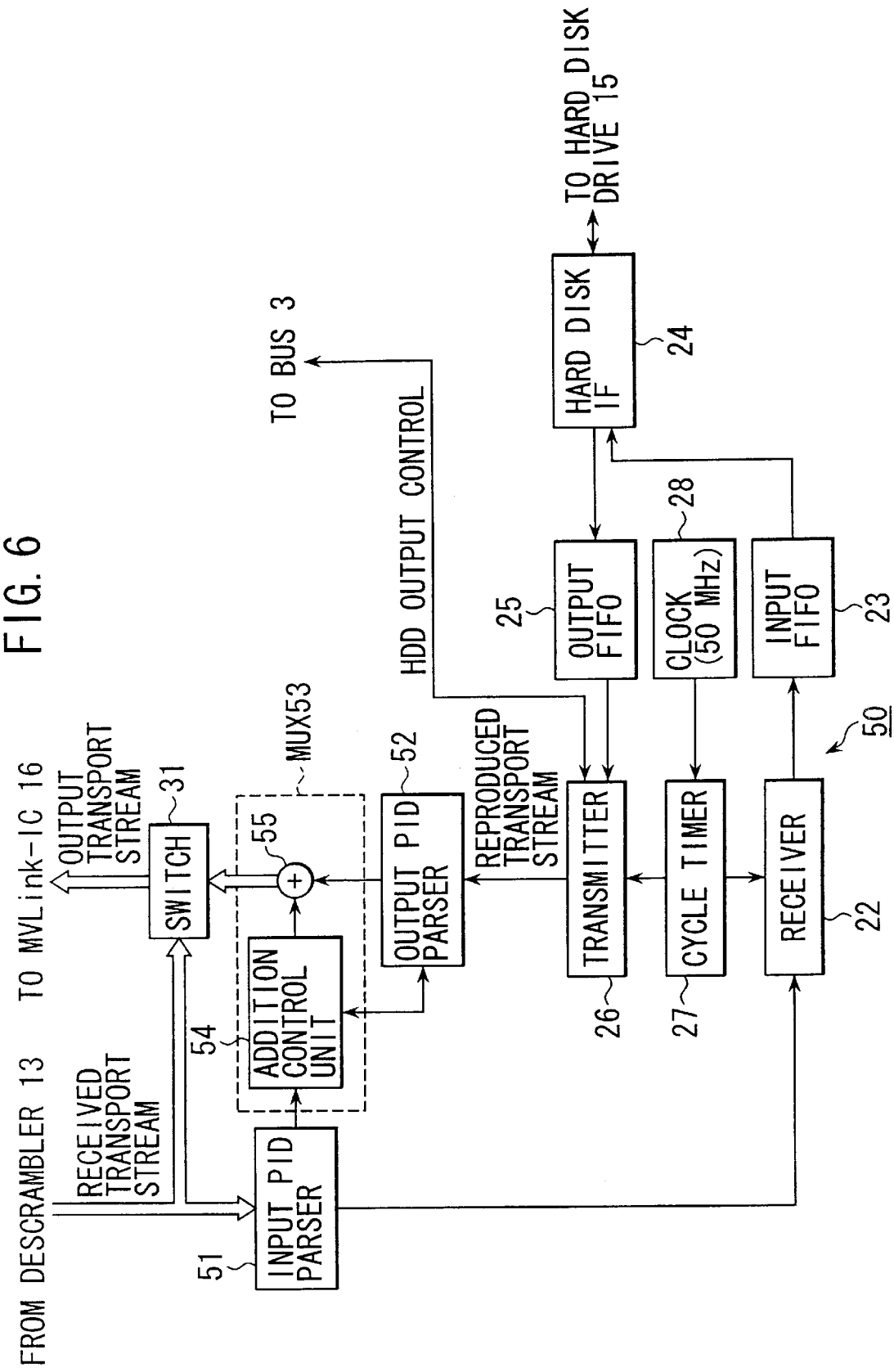
FIG. 6 is a block diagram for illustrating an exemplary structure of a hard disk control unit 50 shown in FIG. 5.

FIG. 6 shows an exemplary structure of the hard disk control unit 50 shown in FIG. 5. In FIG. 6, the same components corresponding to those of the hard disk control unit 14 shown in FIG. 1 are given the same characters, and the description is omitted hereinafter. The hard disk control unit 50 has the same structure as that of the hard disk control unit 14 shown in FIG. 1 excepting that the hard disk control unit 50 further comprises an input PID parser 51, an output PID parser 52, and an MUX (multiplexer) 53, and the PID parser 21 is eliminated.

The received transport stream supplied from the descrambler 13 is supplied to the switch 31 and the input PID parser 51. From the TS packet that constitutes the received transport stream supplied from the descrambler 13, the input PID parser 51 extracts the TS packet to be only recorded (referred to as recording packet hereinafter properly), the TS packet to be recorded and to be used for controlling (referred to as recording/controlling packet hereinafter properly), the TS packet to be used for only control (referred to as controlling packet hereinafter properly), and the TS packet to be discarded (referred to as discarding packet hereinafter properly), and supplies the recording packet and the recording/controlling packet to the receiver 22 and supplies the controlling packet to the MUX 53. Furthermore, the input PID parser 51 discards the discarding packet.

The output PID parser 52 receives the reproduced transport stream that has been reproduced by the hard disk drive 15 and has been supplied from the transmitter 26, and extracts the TS packet to be reproduced (referred to as reproducing packet hereinafter properly) and the TS packet to be discarded (discarding packet) from among the TS packets that constitute the reproduced transport stream. Furthermore, the output PID parser 52 supplies the reproducing TS packet to the MUX 53 and discards the discarding packet.

Furthermore, the output PID parser 52 communicates with an addition control unit 54, which will be described hereinafter, of the MUX 53 to thereby detects the reproducing TS packet having the same PID as that of TS packet supplied to the MUX 53 from the input PID parser 51, and convert the PID of the reproducing TS packet to a different PID.

The MUX 53 comprising the addition control unit 54 and a gate circuit 55 multiplexes the TS packet supplied from the input PID parser 51 and the TS packet supplied from the output PID parser 52, and supplies them to the switch 31. In detail, the addition control unit 54 shifts the output timing of the TS packet that the addition control unit 54 itself is going to send out when the timing of output of the TS packet from the input PID parser 51 to the gate circuit 55 coincides with the timing of output of the TS packet from the output PID parser 52 to the gate circuit 55. Thereby, collision between the TS packet sent out from the input PID parser 51 itself and the TS packet sent out from the output PID parser 52 on the gate circuit 55 is prevented. The gate circuit 55 merely transfers the TS packet supplied from the addition control unit 54 and the TS packet supplied from the output PID parser 52 to the switch 31.

Next, the detail of the input PID parser 51 shown in FIG. 6 will be described with reference to FIG. 7A and FIG. 7B.

Figures 7A, 7B:
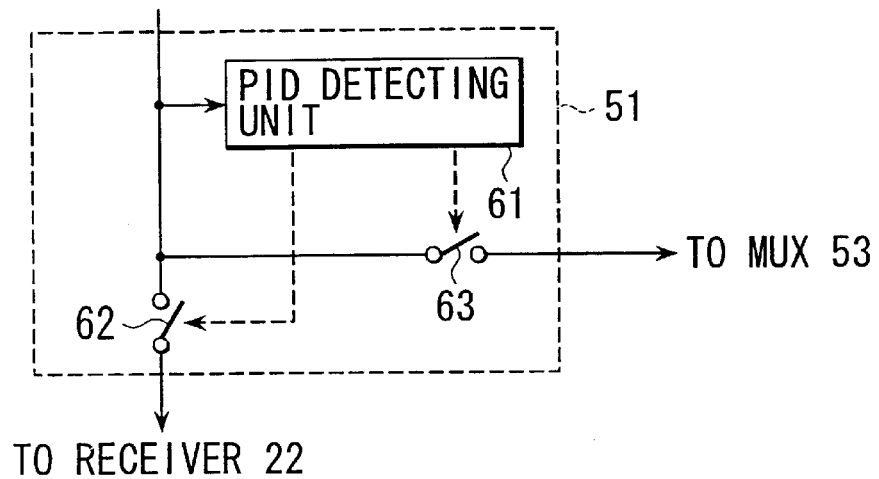
FIG. 7A and FIG. 7B are diagrams for describing the detail of an input PID parser 51 shown in FIG. 6.

FIG. 7A shows an exemplary structure of the input PID parser 51.

As shown in FIG. 7A, the input PID parser 51 comprises a PID detecting unit 61 and switches 62 and 63.

The PID detecting unit 61 detects the PID of the TS packet that constitutes the received transport stream supplied from the descrambler 13, and controls the switches 62 and 63 based on the detection result.

The switch 62 is turned ON/OFF under the control by means of the PID detecting unit 61 to thereby control the supply of the TS packet that constitutes the received transport stream to the receiver 22. The switch 63 is also turned ON/OFF under the control by means of the PID detecting unit 61 to thereby control the supply of the TS packet that constitutes the received transport stream to the MUX 53.

The input PID parser 51 having the structure as described hereinabove supplies the TS packet that constitutes the received transport stream supplied from the descrambler 13 to the PID detecting unit 61 and the switches 62 and 63.

The PID detecting unit 61 detects the PID of the TS packet supplied thereto and recognizes whether the TS packet is the TS packet on which the AV data to be recorded is loaded, the TS packet on which the control data necessary to reproduce the AV data is loaded, the TS packet on which the control data necessary to descramble the transport stream supplied from the tuner 12 is loaded, or the TS packet that does not correspond to any one of the above TS packets.

If the TS packet corresponds to the TS packet on which the AV data to be recorded is loaded, then the PID detecting unit 61 controls the switches 62 and 63 on the assumption that the TS packet is a recording packet. If the TS packet corresponds to the TS packet on which the control data necessary to reproduce the AV data is loaded, then the PID detecting unit 61 controls the switches 62 and 63 on the assumption that the TS packet is a recording/controlling packet. If the TS packet correspond to the TS packet on which the control data necessary to descramble the transport stream supplied from the tuner is loaded, then the PID detecting unit 61 controls the switches 62 and 63 on the assumption that the TS packet is a controlling packet. If the TS packet corresponds to the TS packet that does not corresponds to any one of the above-mentioned TS packets, then the PID detecting unit 61 controls the switches 62 and 63 on the assumption that the TS packet is a discarding packet.

In other words, the PID detecting unit 61 controls the switches 62 and 63 as shown in FIG. 7B.

In detail, in the case that the TS packet is a discarding packet, the switches 62 and 63 are both turned OFF, and as the result the TS packet is supplies neither to the receiver nor to the MUX 53 and discarded. In the case that the TS packet is a recording packet, the switch 62 or 63 is turned ON or OFF, and as the result the TS packet is supplied only to the receiver 22. Furthermore, in the case that the TS packet is a recording/controlling packet, the switches 62 and 63 are both turned ON, and as the result the TS packet is supplied both to the receiver 22 and the MUX 53. Furthermore, in the case that the TS packet is a recording packet, the switch 62 or 63 is turned OFF or ON, and as the result the TS packet is supplied only to the MUX 53.

As described hereinabove, the discarding packet is discarded, and the recording packet is recorded in the hard disk drive 15. Furthermore, the recording/controlling packet is recorded in the hard disk drive 15 and supplied to the MUX 53, and the controlling packet is supplied to the MUX 53.

Next, the detail of the output PID parser 52 shown in FIG. 6 will be described with reference to FIG. 8A and FIG. 8B.

FIG. 8A shows an exemplary structure of the output PID parser 52.

As shown in FIG. 8A, the output PID parser 52 comprises a PID detecting unit 71, a switch 72, and a PID converting unit 73.

The PID detecting unit 71 detects the PID of the TS packet that constitutes the reproduced transport stream supplied from the transmitter 26 and controls the switch 72 based on the detection result like the PID detecting unit 61 shown in FIG. 7A and FIG. 7B.

The switch 72 is turned ON/OFF under the control by means of the PID detecting unit 71 to thereby control the supply of the TS packet that constitutes the reproduced transport stream to the PID converting unit 73.

The PID converting unit 73 communicates with the MUX 53, converts the PID of the TS packet to be supplied by way of the switch 72 as required, and supplies the TS packet to the MUX 53.

The output PID parser 52 having the structure as described hereinabove supplies the TS packet that constitutes the reproduced transport stream supplied from the transmitter 26 to the PID detecting unit 71 and the switch 72.

The PID detecting unit 71 detects the PID of the TS packet supplied thereto, and recognizes whether the TS packet is the TS packet to be reproduced or the TS packet that is not necessary to be reproduced based on the PID.

If the TS packet corresponds to the TS packet to be reproduced, then the PID detecting unit 71 controls the switch 72 on the assumption that the TS packet is a reproducing packet, on the other hand if the TS packet corresponds to the TS packet that is not necessary to be reproduced, then the PID detecting unit 71 controls the switch 72 on the assumption that the TS packet is a discarding packet.

In detail, the PID detecting unit 71 controls the switch 72 as shown in FIG. 8B.

Therefore, if the TS packet is a discarding packet, then the switch 72 is turned OFF, and as the result the TS packet is discarded without being supplied to the PID converting unit 73. On the other hand, if the TS packet is a reproducing packet, then the switch 72 is turned ON, and as the result the TS packet is supplied to the PID converting unit 73.

Upon receiving the TS packet (reproducing packet) by way of the switch 72, the PID converting unit 73 supplies the TS packet to the gate circuit 55 of the MUX 53. However, the PID converting unit 73 communicates with the addition control unit 54 of the MUX 52, and if the TS packet that is to be supplied to the gate circuit 55 of the MUX 52 from the PID converting unit 73 itself has the same PID as that of the TS packet that the addition control unit of the MUX 53 is going to supply to the gate circuit 55, then the PID converting unit 73 converts the PID of the TS packet that is to be supplied from the PID converting unit 73 itself to a different PID, and supplies the TS packet having the converted PID to the gate circuit 55.

Because the PID is converted even though it is the TS packet that is to be broadcasted in the same channel excepting the special TS packet (for example, the TS packet on which PAT is loaded), the same PID can be allocated both to the TS packet supplied from the input PID parser 61 to the MUX 53 and the TS packet supplied from the output PID parser 52 to the MUX 53 though different data is loaded on both TS packets. In this case, the different data is loaded in the DEMUX 5, it can be difficult to analyze the TS packet to which the same PID is allocated. To solve such problem, the PID converting unit 73 converts the PID of the TS packet that is to be sent out from the PID converting unit 73 itself to a PID different from the PID of the TS packet that is to be sent out from the addition control unit 54 if the TS packet that is to be sent out from the PID converting unit 73 itself to the gate circuit 55 of the MUX 52 is identical with the PID of the TS packet that is to be sent out from the addition control unit 54 of the MUX 53 to the gate circuit 55.

Next, when the digital satellite broadcast receiving apparatus shown in FIG. 5 receives the transport stream served as the digital satellite broadcast program and displays the image and sound served as the transport stream, the same processing as that performed by the digital satellite broadcast receiving apparatus shown in FIG. 1 is performed.

In detail, the antenna 11 received the digital satellite broadcast wave, the obtained received signal is supplied to the tuner 12, and the tuner 12 demodulates the received signal supplied from the antenna 11 to obtain the transport stream, and the transport stream is supplied to the descrambler 13. The descrambler 13 descrambles the scrambled transport stream supplied from the tuner 12 by use of a decoding key supplied from the CPU 1, and supplies it to the hard disk control unit 50.

The transport stream supplied from the descrambler 13 (received transport stream) is supplied to the input PID parser 51 and the switch 31 of the hard disk control unit 50 (FIG. 6). In this case, the switch 31 selects the received transport stream supplied from the descrambler 13, and supplies it to the MVLink-IC 16 as the output transport stream.

Subsequently, the output transport stream is isochronously transferred on the IEEE 1394 serial bus by way of the PHY-IC 17 or supplied to the monitor by way of the DEMUX 5, FIFO memory 6, and the decoder 7 as in the case shown in FIG. 1.

In this case, because the received transport stream is supplied to the DEMUX 5 as the output transport stream, the DEMUX 5 obtains the necessary control data from the received transport stream and supplies it to the CPU 1. Therefore, the descrambler 13 can descramble the transport stream supplied from the tuner 12.

Next, when the received transport stream is to be recorded, the switch 31 selects the received transport stream supplied from the descrambler 13, and supplies it to the DEMUX 5 by way of the MVLink-IC 16 as the output transport stream. Therefore, also in this case, the DEMUX 5 obtains the necessary control data from the received transport stream supplied as the output transport stream and can supply it to the CPU 1, and as the result the descrambler 13 can descramble the transport stream supplied from the tuner 12.

Furthermore, in this case, the input PID parser 51 supplies only the TS packet of the program that is to be recorded (the above-mentioned recording packet and the recording/controlling packet) and discards the residual TS packet with referring to the PID of the TS packet that constitutes the received transport stream supplied thereto. Subsequently the same processing as performed in the case shown in FIG. 1 is performed, and the TS packet supplied from the input PID parser 51 to the receiver 22 is recorded in the hard disk drive 15.

Next, when the TS packet recorded in the hard disk drive 15 as described hereinabove is to be reproduced, the TS packet recorded in the hard disk drive 15 is reproduced as in the case shown in FIG. 1, and the reproduced transport stream obtained as the result is supplied from the transmitter 26 to the output PID parser 52.

The output PID parser 52 supplies only the TS packet to be reproduced (the above-mentioned reproducing packet) to the MUX 53 with referring to the PID of the TS packet that constitutes the reproduced transport stream supplied thereto, and discards the residual TS packet.

The MUX 53 supplies the TS packet supplied from the output PID parser 52 to the gate circuit 55. Furthermore, in this case, because only reproduction of the TS packet recorded in the hard disk drive 15 is performed, the TS packet is not supplied from the input PID parser 51 to the gate circuit 55 by way of the addition control unit 54. Therefore, the gate circuit 55 allows the TS packet to be supplied from the output PID parser 52 to the switch circuit 31 successively.

Subsequently, in the same manner as shown in FIG. 1, the TS packet recorded in the hard disk drive 15 is isochronously transferred on the IEEE 1394 serial bus by way of the PHY-IC 17 or supplied to the monitor by way of the DEMUX 5 and the decoder 7.

Next, the processing performed when the digital satellite broadcast receiving apparatus shown in FIG. 5 reproduces the transport stream recorded already in the hard disk drive 15 while the received transport stream is being recorded in the hard disk drive 15 will be described with reference to FIG. 9A to FIG. 9I.

For example, it is assumed that the transport stream composed of sequential TS packets as shown in FIG. 9A is supplied from the descrambler 13 to the hard disk control unit 50 as the received transport stream.

In FIG. 9A to FIG. 9I, a square having S and a numeral represents a TS packet on which the control data is loaded, and a square having AV and a numeral represents a TS packet on which the AV data is loaded.

In the received transport stream shown in FIG. 9A, it is assumed that the control data Si loaded on a TS packet #S1 (a TS packet on which the data Si is loaded) contains the information necessary for reproducing the AV data AV1 loaded on a TS packet #AV1 (for example, PMT on which PID of the TS packet #AV1 or the like), and furthermore, for example, the control data S2 loaded on a TS packet #S2 contains a decoding key for descrambling the transport stream (payload of the TS packet) in the descrambler 13.

In this case, it is assumed that the AV data AV1 is the AV data of the program to be recorded, then it is necessary to record TS packets #S1, #AV1 shown in FIG. 9B out of the TS packets that are components of the received transport stream shown in FIG. 9A. In other words, it is necessary to record not only the AV data AV1 that is to be recorded but also the control data S1 that is necessary for reproducing.

Furthermore, it is necessary to supply the TS packet #S2 to the CPU 1 in order to descramble the transport stream by means of the descrambler 13.

Accordingly, TS packets #AV2 on which the AV data AV2 is loaded is unnecessary out of the TS packets that are components of the received transport stream shown in FIG. 9A and these TS packets is to be discarded as shown in FIG. 9C. When the input PID parser 51 (FIG. 7A and FIG. 7B) receives a TS packet AV2 by means of the PID detecting unit 61, the switches 62 and 63 are both turned OFF as described hereinabove and the TS packet AV2 is thereby discarded.

Furthermore, a TS packet #AV1 on which the AV data AV1 to be recorded is loaded is the recording packet that is only to be recorded, the switches 62 or 63 is turned ON or OFF at the timing when a TS packet is received as shown in FIG. 9D in the PID detecting unit 61 of the input PID parser 51 (FIG. 7A and FIG. 7B), and the TS packet AV1 is thereby supplied to the receiver 22 and recorded in the hard disk driver 15.

It is necessary to record the control data S1 such as PMT or the like loaded on a TS packet #S1 that is to be recorded because the control data S1 is necessary for reproducing the AV data AV1, and also it is necessary to supply the control data S1 to the CPU 1 in order to recognize the data loaded on the TS packet based on the PID of the TS packet by means of the DEMUX 5 or the like. Therefore, the TS packet #S1 is recorded and also served as the recording/controlling packet used by the CPU 1 for controlling. In the PID detecting unit 61 of the input PID parser 51 (shown in FIG. 7A and FIG. 7B) the switches 62 and 63 are both turned ON at the timing when a TS packet #S1 is received as shown in FIG. 9E, the TS packet #S1 is thereby supplied to the receiver 22 and recorded in the hard disk drive 15, and supplied to the MUX 53 and subsequently supplied to the CPU 1 as described hereinafter.

Because the control data S2 such as a decoding key or the like loaded on a TS packet #S2 is necessary for the descrambler 13 to descramble but not necessary to reproduce the AV data AV1 to be recorded, the TS packet #S2 is the controlling packet used only for controlling. In the PID detecting unit 61 of the input PID parser 51 (FIG. 7A and FIG. 7B), the switches 62 or 63 is turned OFF or ON at the timing when a TS packet #S2 is received as shown in FIG. 9F as described hereinabove, and the TS packet #S2 is supplied to the MUX 53 and subsequently supplied to the CPU 1 as described hereinafter.

On the other hand, it is assumed that the hard disk drive 15 reads out the recorded TS packets, and the reproduced transport stream that is sequential TS packets, for example, as shown in FIG. 9G is thereby supplied from the transmitter 26 to the output PID parser 52.

In the reproduced transport stream shown in FIG. 9G, it is assumed that the AV data loaded on a TS packet #AV3 is the AV data that is required to be reproduced, and the control data S1' loaded on a TS packet #S1' is the information necessary to reproduce the AV data AV3 loaded on the TS packet #AV3 (for example, PMT that describes the PID of a TS packet #AV3 or the like). Furthermore, it is assumed that the control data S4 loaded on a TS packet #S4 is unnecessary to reproduce the AV data AV3.

In this case, in the PID detecting unit 71 of the output PID parser 52 (FIG. 8A and FIG. 8B), the switch 72 is turned OFF at the timing when a TS packet #S4 is received as described hereinabove, and the TS packet #S4 is thereby discarded. Furthermore, in the PID detecting unit 71, the switch 72 is turned ON at the timing when a TS packet #S1' and TS packet #AV3 are received, and the TS packets #S1' and AV3 are thereby supplied from the output PID parser 52 to the MUX 53 as shown in FIG. 9H.

As described hereinabove, the TS packet S1 is supplied from the input PID parser 51 to the MUX 53 (FIG. 9E), at that time if the PID of the TS packet #S1 is identical with the PID of the TS packet #S1' supplied from the output PID parser 52 to the MUX 53, then the PID converting unit 73 of the output PID parser 52 (FIG. 8A and FIG. 8B) converts the PID of the TS packet #S1' as described hereinabove and thereafter supplies it to the MUX 53. The shading in FIG. 9H and FIG. 9I on the TS packets #S1' means that the PID of the TS packets #S1' shown in FIG. 9G has been changed.

The MUX 52 supplies the TS packet supplied from the output PID parser 52 to the switch 31 by way of the operator 55.

Furthermore, the MUX 53 receives the TS packet from the output PID parser 52, and receives the TA packets #S1 and #S2 from the input PID parser 51 as shown in FIG. 9E and FIG. 9F. Out of these TS packets, the timing when the TS packet #S1 is supplied from the input PID parser 51 overlaps with the timing when the output PID parser 52 sends out the TS packet #S1' as shown in FIG. 9H. Therefore, the TS packet #S1 sent out from the input PID parser 51 will collide with the TS packet #S1' sent out from the output PID parser 52 at the gate circuit 55 in the MUX 53 if the TS packet #S1 sent out from the input PID parser 51 and the TS packet #S1' sent out from the output PID parser 52 are supplied to the gate circuit 55 as they are.

To avoid such problem, if the timing when the input PID parser 51 sends out the TS packet to the gate circuit 55 overlaps with the timing when the output PID parser 52 sends out the TS packet to the gate circuit 55, the addition control unit 54 of the MUX 53 shifts the output timing of the TS packet that is to be sent out by itself to thereby prevent the collision between the TS packet sent out by itself and the TS packet sent out from the output PID parser 52 at the gate circuit 55.

In detail, in this case, the addition control unit 54 temporarily stores the TS packet #S1 supplied from the input PID parser 51, and sends out the stored TS packet S1 to the gate circuit 55 in a free time space when the TS packet is not sent out from the output PID parser 52 after the TS packet sent out from the output PID parser 52 passes through the gate circuit 55 as shown in FIG. 9I. Thereby, the timing of the TS packer #S1 is shifted so that the TS packet #S1 does not collide with the TS packet sent out from the output PID parser 52, and the TS packet #S1 is allowed to pass through the gate circuit 55. As shown in FIG. 9F, because the timing when the TS packet #S2 supplied from the input PID parser 51 is supplied to the MUX 53 does not overlap with the timing when the TS packet supplied from the output PID parser 52 is supplied to the MUX 53, the TS packet is sent out to the gate circuit 55 and the switch 31 without shifting of the timing.

The addition control unit 54 recognizes the free time space when the TS packet is not supplied from the output PID parser 52 to the gate circuit 55. In detail, the addition control unit 54 communicates with the output PID parser 52 to thereby obtain the time stamp that is added to the TS packet to be sent out from the output PID parser 52, and calculates the difference between the time stamp of the newest TS packet sent out from the output PID parser 52 and the time stamp of the TS packet that is to be sent out next to thereby recognize the free time space. The output PID parser 51 obtains the time stamp added to the TS packet from the transmitter 26.

As described hereinabove, the MUX 53 supplies the transport stream that is sequential TS packets as shown in FIG. 9I to the switch 31.

In the case that the received transport stream is recorded and the transport stream recorded in the hard disk drive 15 is reproduced simultaneously, the switch 31 supplies the transport stream that is sequential TS packets supplied from the MUX 53 to the MVLink-IC 16 as the output transport stream, as the result the transport stream (FIG. 9I) is isochronously transferred on the IEEE 1394 serial bus by way of the PHY-IC 17, or sent out to the monitor by way of the DEMUX 5, FIFO memory 6, and AV decoder 7.

Therefore, because the control data S1', necessary to reproduce the AV data AV3 is supplied to the CPU 1 by way of the DEMUX 5, the AV data AV3 is reproduced normally.

Furthermore, the control data S2 such as decoding key or the like used for descrambling is also supplied to the CPU 1 by way of the DEMUX 5, as the result the descrambler 13 can descramble the transport stream supplied from the tuner 12.

Furthermore, the control data Si such as PMT or the like is supplied to the CPU 1 by way of the DEMUX 5 and the CPU 1 can thereby obtain the information or the like for knowing the status of the digital satellite broadcast in real time, and as the result occurrence of various problems is prevented.

As described hereinabove, in the digital satellite broadcast receiving apparatus shown in FIG. 5, the received transport stream is recorded and the transport stream recorded in the hard disk drive 15 is reproduced simultaneously. As the result, for example, it is possible to perform the delayed playback, that is, while the received transport stream is being recorded in the hard disk drive 15, the recorded transport stream is reproduced immediately.

The above-mentioned series of processing can be implemented not only by means of the hardware but also by means of the software. In the case that the series of processing is implemented by means of the software, a program that constitutes the software is installed in a computer or a general-purpose computer that is incorporated in a digital satellite broadcast receiving apparatus served as the exclusive hardware.

A recording medium in which the program to be installed in a computer for enabling the computer to execute the above-mentioned series of processing is recorded will be described with reference to FIG. 10A to FIG. 10C.

Figure 10A:
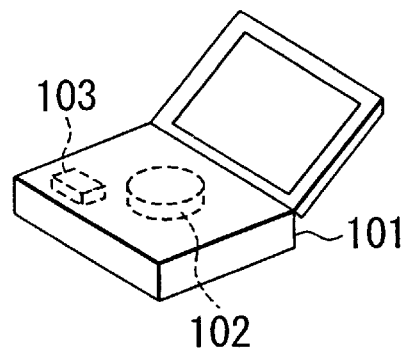
FIG. 10A to FIG. 10C are diagrams for describing recording media to which the present invention is applied.

The program may be stored previously in a hard disk 102 or semiconductor memory 103 provided as the built-in recording medium in the computer 101 as shown in FIG. 10A.

Figure 10B:
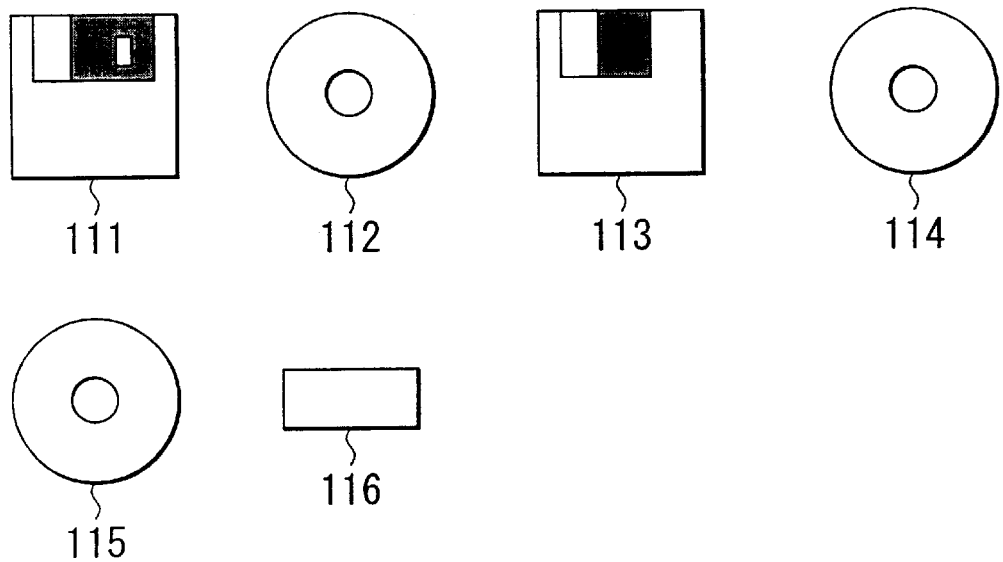

Otherwise, the program may be stored temporarily or permanently in a recording medium such as a floppy disk 111, a CD-ROM (Compact Disc Read Only Memory) 112, an MO (Magneto-optical) disk 113, a DVD (Digital Versatile Disc) 114, a magnetic disk 115, or a semiconductor memory 116 as shown in FIG. 10B. Such recording medium is provided as so-called package software.

Figure 10C:
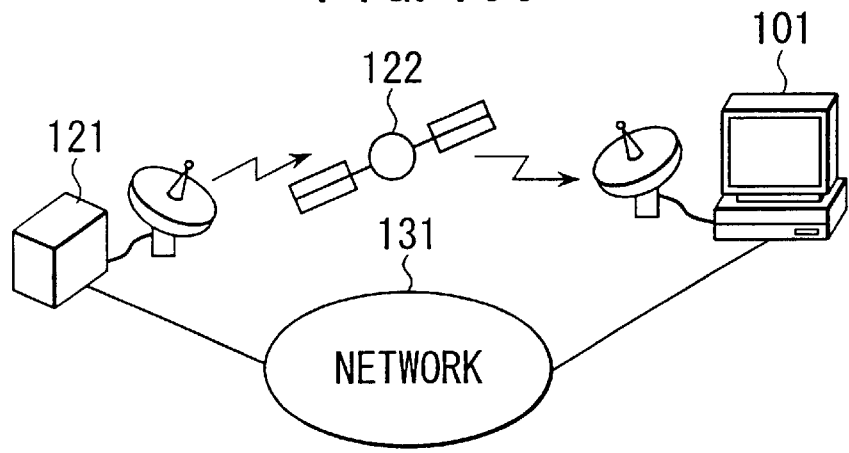

The program maybe transferred wirelessly to the computer 101 from a download site 121 by way of a digital satellite broadcasting artificial satellite 122 as shown in FIG. 10C in addition to a method in which the program is installed from a recording medium as described hereinabove, and further otherwise the program may be transferred to the computer through a wire by way of LAN (Local Area Network) or a network such as the Internet and installed in the built-in hard disk 102 of the computer 101.

In the present specification, the processing step for describing the program for performing various processing by means of the computer is not necessarily implemented in the order of time series described in the flowchart, and includes parallel processing or processing to be implemented separately (for example, parallel processing or processing by means of object)

The program may be processed by means of a single computer or may be processed separately by means of a plurality of computers. Furthermore, the program may be transferred to a computer located remotely and implemented therein.

Next, FIG. 11 shows an exemplary structure of the computer 101 shown in FIG. 10A and FIG. 10C.

The computer 101 has a built-in CPU (Central Processing Unit) 142 as shown in FIG. 11. The CPU 142 is connected to the input/output interface 145 by way of the bus 141. When a user enters a command by operating an input unit 147 having a key board and mouse or the like as the component by way of the input/output interface 145, the CPU 142 loads the program stored in the ROM (Read Only Memory) 143 corresponding to the semiconductor memory 103 shown in FIG. 10A. Otherwise, the CPU 142 loads the program stored in the hard disk 102, the program that has been transferred from the satellite 122 or network 131 and received by means of the communication unit 148 and installed in the hard disk 102, or the program that has been read out from the floppy disk 111 mounted on the drive 149, the CD-ROM 112, the MO disk 113, the DVD 114, or the magnetic disk 115 and installed in the hard disk 102 on the RAM (Random Access Memory), and the CPU 142 executes the program. Then, the CPU 142 sends out the processing result to, for example, the display unit comprising a LCD (Liquid Crystal Display) or the like as required by way of the input/output interface 145.

In the present embodiment, the present invention is described in respect to the digital satellite broadcast receiving apparatus for receiving the digital satellite broadcast wave to which the present invention is applied, however, the present invention may be applied to any apparatus that receives the digital data.

In the present embodiment, the digital satellite broadcast receiving apparatus having the built-in hard disk drive 15 is described, however, the hard disk drive 15 may be of a detachable type.

The transport stream described in the present specification may include not only the stream having 188 byte TS packets but also, for example, the stream or the like having 130 byte packets, which is used for DSS (Direct Satellite System) used by Direc TV company in the US and decoded in the same principle as used for decoding the TS packet.

What is claimed is:

1. Data processing apparatus for receiving and processing a transport stream of packets for allowing simultaneous recording of the transport stream by a recording apparatus and reproduction from the recorded transport stream, comprising:
   (a) a multiplexer;
   (b) an input PID parser in communication with said multiplexer and the recording apparatus for selecting different types of packets included in a transport stream, comprising
      an input for receiving packets from said transport stream,
      a first output for outputting recording/controlling packets from said transport stream to said multiplexer, and
      a second output for outputting recording packets and said recording/controlling packets to the recording apparatus; and
   (c) an output PID parser in communication with the recording apparatus and said multiplexer for selecting different types of packets included in a reproduced transport stream, comprising
      an input for receiving packets from a reproduced transport stream of packets reproduced from the recording apparatus, said reproduced transport stream including prerecorded data packets corresponding to said recording packets and prerecorded recording/controlling packets corresponding to said recording/controlling packets, and
      an output for supplying said prerecorded data packets and said prerecorded recording/controlling packets to said multiplexer,
   wherein said multiplexer multiplexes said recording/controlling packets, said prerecorded data packets and said prerecorded recording/controlling packets to form an output transport stream of packets.

2. The data processing apparatus as claimed in claim 1, wherein said multiplexer further includes an addition control unit operable to shift an output timing of said recording/controlling packets prior to multiplexing when said prerecorded recording/controlling packets and said recording/controlling packets coincide in time.

3. The data processing apparatus as claimed in claim 2, wherein said addition control unit is in communication with said output PID parser to obtain timing information supplied with said prerecorded data packets to said output PID parser to determine a free time space for said shifting.

4. The data processing apparatus as claimed in claim 3, further comprising a receiver in communication with said second output of said input PID parser and the recording apparatus for adding time stamps to said packets to be recorded by the recording apparatus, and wherein said timing information corresponds to said time stamps.

5. The data processing apparatus as claimed in claim 1, wherein said first output of said input PID parser further outputs to said multiplexer a controlling packet containing descrambling information for multiplexing into said output transport stream of packets.

6. The data processing apparatus as claimed in claim 1, wherein said multiplexer further includes an addition control unit in communication with said output PID parser to compare PID information of packets to be multiplexed and wherein said output PID parser changes the PID of said prerecorded recording/controlling packets if it is the same as the PID of said recording/controlling packets when said recording/controlling packets and said prerecorded recording/controlling packets are to be multiplexed in said output transport stream of packets.

7. The data processing apparatus as claimed in claim 1, wherein the recording apparatus is incorporated in said data processing apparatus.

8. A data processing method for processing transport streams of packets, comprising:
   (a) receiving packets from a transport stream of packets including recording packets and recording/controlling packets;
   (b) selecting said recording packets and said recording/controlling packets from said transport stream and outputting said recording packets and said recording/controlling packets to a recording apparatus;
   (c) receiving packets from a reproduced transport stream of packets reproduced from the recording apparatus, said reproduced transport stream including prerecorded data packets corresponding to said recording packets and prerecorded recording/controlling packets corresponding to said recording/controlling packets;
   (d) selecting said prerecorded data packets and said prerecorded recording/controlling packets from said reproduced transport stream; and
   (e) multiplexing said recording/controlling packets selected from said transport stream, said prerecorded data packets selected from said reproduced transport stream and said prerecorded recording/controlling packets selected from said reproduced transport stream to form an output transport stream of packets.

9. The method as claimed in claim 8, further comprising shifting an output timing of said recording/controlling packets prior to said multiplexing when said prerecorded recording/controlling packets and said recording/controlling packets coincide in time.

10. The method as claimed in claim 9, further comprising obtaining timing information supplied with said prerecorded data packets and determining a free time space for said shifting from said timing information.

11. The method as claimed in claim 10, further comprising adding time stamps to said packets to be recorded by the recording apparatus, and wherein said timing information corresponds to said time stamps.

12. The method as claimed in claim 8, further comprising selecting from the transport stream a controlling packet containing descrambling information and multiplexing said controlling packet selected from said transport stream into said output transport stream of packets.

13. The method as claimed in claim 8, further comprising comparing PID information of packets to be multiplexed and changing the PID of said prerecorded recording/controlling packets if it is the same as the PID of said recording/controlling packets when said recording/controlling packets and said prerecorded recording/controlling packets are to be multiplexed in said output transport stream of packets.

14. Data processing apparatus for receiving and processing a transport stream of packets for allowing simultaneous recording of the transport stream by a recording means for recording data and reproduction from the recorded transport stream, comprising:

(a) input parsing means for receiving different types of packets included in a transport stream and selectively outputting (i) recording/controlling packets from said transport stream and (ii) recording packets from said transport stream;

(b) output PID parsing means for receiving different types of packets included in a reproduced transport stream of packets reproduced from said recording means and selectively outputting (i) prerecorded data packets from said reproduced transport stream corresponding to said recording packets and (ii) prerecorded recording/controlling packets from said reproduced transport stream corresponding to said recording/controlling packets; and (c) multiplexing means for multiplexing said recording/controlling packets from said input parsing means, said prerecorded data packets from said output parsing means and said prerecorded recording/controlling packets from said output parsing means to form an output transport stream of packets.

15. The data processing apparatus as claimed in claim 14, wherein said multiplexing means further includes shifting means for shifting an output timing of said recording/controlling packets prior to multiplexing when said prerecorded recording/controlling packets and said recording/controlling packets coincide in time.

16. The data processing apparatus as claimed in claim 15, wherein said shifting means further obtains timing information supplied with said prerecorded data packets to said output parsing means to determine a free time space for said shifting.

17. The data processing apparatus as claimed in claim 16, further comprising receiver means for adding time stamps to said packets to be recorded by said recording means, and wherein said timing information corresponds to said time stamps.

18. The data processing apparatus as claimed in claim 14, wherein said input parsing means further outputs a controlling packet containing descrambling information for multiplexing into said output transport stream of packets.

19. The data processing apparatus as claimed in claim 14, wherein said multiplexing means further includes comparison means for comparing PID information of packets to be multiplexed and wherein said output parsing means changes the PID of said prerecorded recording/controlling packets if it is the same as the PID of said recording/controlling packets when said recording/controlling packets and said prerecorded recording/controlling packets are to be multiplexed in said output transport stream of packets.

20. The data processing apparatus as claimed in claim 14, wherein said recording means is incorporated in said data processing apparatus.

21. A recording medium containing a computer-executable program for processing transport streams of packets in a data processing apparatus, wherein said program contains instructions for causing said data processing apparatus to:

(a) receive packets from a transport stream of packets including recording packets and recording/controlling packets;

(b) select said recording/controlling packets from said transport stream and output said recording/controlling packets to a recording apparatus;

(c) receive packets from a reproduced transport stream of packets reproduced from the recording apparatus, said reproduced transport stream including prerecorded data packets corresponding to said recording packets and prerecorded recording/controlling packets corresponding to said recording/controlling packets;

(d) select said prerecorded data packets and said prerecorded recording/controlling packets from said reproduced transport stream; and (e) multiplex said recording/controlling packets selected from the transport stream, said prerecorded data packets selected from said reproduced transport stream and said prerecorded recording/controlling packets selected from said reproduced transport stream to form an output transport stream of packets.

22. The recording medium as claimed in claim 21, wherein said program further comprises instructions for shifting an output timing of said recording/controlling packets prior to said multiplexing when said prerecorded recording/controlling packets and said recording/controlling packets coincide in time.

23. The recording medium as claimed in claim 22, wherein said program further comprises instructions for obtaining timing information supplied with said prerecorded data packets and for determining a free time space for said shifting from said timing information.

24. The recording medium as claimed in claim 23, wherein said program further comprises instructions for adding time stamps to said packets to be recorded by the recording apparatus, and wherein said timing information corresponds to said time stamps.

25. The recording medium as claimed in claim 21, wherein said program further comprises instructions for selecting from the transport stream a controlling packet containing descrambling information and for multiplexing said controlling packet selected from said transport stream into said output transport stream of packets.

26. The recording medium as claimed in claim 21, wherein said program further comprises instructions for comparing PID information of packets to be multiplexed and for changing the PID of said prerecorded recording/controlling packets if it is the same as the PID of said recording/controlling packets when said recording/controlling packets and said prerecorded recording/controlling packets are to be multiplexed in said output transport stream of packets.

* * * * *

UNITED STATES PATENT AND TRADEMARK OFFICE
CERTIFICATE OF CORRECTION

PATENT NO. : 6,779,198 B1
DATED : August 17, 2004
INVENTOR(S) : Takeo Morinaga et al.

It is certified that error appears in the above-identified patent and that said Letters Patent is hereby corrected as shown below:

Column 1,
Line 22, after "to" insert -- an --.

Column 3,
Line 61, "An" should read -- an --.

Column 4,
Line 1, "hardkdisk" should read -- hard disk --.
Line 16, "circuit" should read -- Circuit --.

Column 5,
Line 10, "is" should read -- are --.

Column 6,
Line 53, after "stream" insert -- that --.

Column 9,
Line 38, "detects" should read -- detect --.

Column 10,
Line 29, "correspond" should read -- corresponds --.

Column 13,
Lines 31 and 32, "Si" should read -- S1 --.
Line 60, "switches" should read -- switch --.

Column 14,
Line 21, "switches" should read -- switch --.

UNITED STATES PATENT AND TRADEMARK OFFICE
CERTIFICATE OF CORRECTION

PATENT NO.  : 6,779,198 B1
DATED       : August 17, 2004
INVENTOR(S) : Takeo Morinaga et al.

It is certified that error appears in the above-identified patent and that said Letters Patent is hereby corrected as shown below:

<u>Column 16,</u>
Line 1, "Si should read -- S1 --.
Line 39, "maybe" should read -- may be --.

Signed and Sealed this

Fourth Day of January, 2005

JON W. DUDAS
*Director of the United States Patent and Trademark Office*